United States Patent Office 3,283,038
Patented Nov. 1, 1966

3,283,038
PHOSPHORUS CONTAINING COMPOUNDS
Walter Lorenz, Wuppertal-Vohwinkel, and Gerhard Schrader, Wuppertal-Kronenberg, Germany, assignors to Farbenfabriken Bayer Aktiengesellschaft, Leverkusen, Germany, a corporation of Germany
No Drawing. Filed Oct. 13, 1961, Ser. No. 144,854
Claims priority, application Germany, Oct. 14, 1960, F 32,338
21 Claims. (Cl. 260—942)

The present invention relates to and has as its objects new and useful insecticidal and active compounds and processes for the production thereof. The new phosphorus derivatives of this invention may be represented by the following formula:

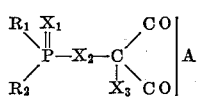

$R_1$ and $R_2$ represent optionally substituted alkoxy, alkylmercapto, aryloxy, arylmercapto, aralkoxy, cycloalkoxy, optionally substituted amino residues, alkyl, aralkyl, cycloalkyl or aryl residues; $X_1$ represents oxygen or sulphur, $X_2$ is sulphur, and $X_3$ hydrogen, an alkyl or an aryl residue or a halogen atom; A represents the residues of malonic amide (thio-) esters or malonic acid diamides or (thio- or imino-) barbituric acid compounds.

Phosphoric acid and thiophosphoric acid esters having the general formula

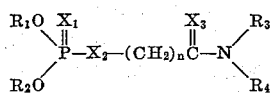

wherein $R_1$ and $R_2$ denote alkyl, aralkyl, cycloalkyl, or aryl residues, $R_3$ and $R_4$ are hydrogen atoms or alkyl, hydroxy alkyl, aryl, or nitroaryl residues, $X_1$, $X_2$ and $X_3$ are sulfur or oxygen, and $n$ represents a small integer, are known. These esters are obtained from a halogenated fatty acid amide by reacting it with a salt of a corresponding thio- or dithio-phosphoric acid.

In accordance with the present invention it has now been found that novel and not previously described esters of phosphoric and thiophosphoric acids, of phosphonic and thiophosphonic acids, of phosphinic and thiophosphinic acids are obtained when halogenomalonic acid amide (thio-) esters or halogenomalonic acid diamides are brought to reaction with corresponding derivatives of (thio-) phosphoric (phosphonic, phosphinic) acids in the presence of a suitable acid-binding agent or their alkali or ammonium metal salts. The starting material, namely the halogenomalonic acid amide esters or diamides are known from the literature. The following general reaction scheme may characterise the course of the reaction:

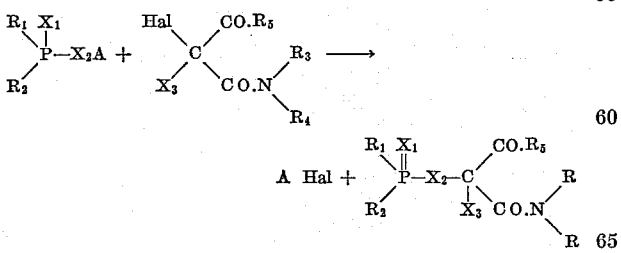

In the general formula more specifically, there represent, for example, $R_1$ and $R_2$ alkoxy, alkylmercapto, aryloxy, arylmercapto, aralkoxy, cycloalkoxy residues which may be substituted in any way, optionally substituted alkyl, aralkyl, cycloalkyl, or aryl residues.

In the above compounds, $R_1$ and $R_2$ may be the same as well as different residues. Where $R_1$ and $R_2$ denote alkyl residues, they may be straight chain or branched, saturated or unsaturated.

Typical residues are: $CH_3O$, $C_2H_5O$, $nC_3H_7O$, $iC_3H_7O$, $nC_4H_9O$, $CH_2S$, $C_2H_5S$, $C_6H_5O$, $C_6H_5S$, $C_6H_5CH_2O—$, $C_6H_{11}O$, $C_6H_{11}S$, $CH_3$, $Cl.CH_2$, $C_2H_5$, $C_6H_{11}$, $C_6H_5CH_2—$, $C_6H_5$, $Cl—C_6H_4—$ and the like.

$X_1$ is oxygen of sulfur,
$X_2$ is sulfur,
$X_3$ is hydrogen, an alkyl or aryl residue or a halogen atom,
Hal is chlorine or bromine,
$R_3$ and $R_4$ are hydrogen, alkyl, aralkyl, cycloalkyl or aryl residues which may optionally be substituted. $R_3$ and $R_4$ may in this instance be the same or different or ring-closed. In the case where $R_3$ and $R_4$ denote alkyl groups, these may again be straight chain or branched, saturated or unsaturated.
$R_5$ is an alkoxy, alkylmercapto, aryloxy, arylmercapto residue or a further group

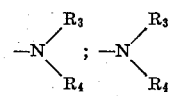

may also be a heterocyclic ring of the morpholine, piperidine, piperazine, pyrrolidine type, and the like.

Thus, for instance, the O,O-dimethyl-S-[di-(methylaminocarbonyl-)]-methyl-thionophosphoric acid ester may be obtained by reaction of the sodium salt of dimethyl-dithio-phosphoric acid with bromomalonic acid-bis-monomethylamide according to the following equation:

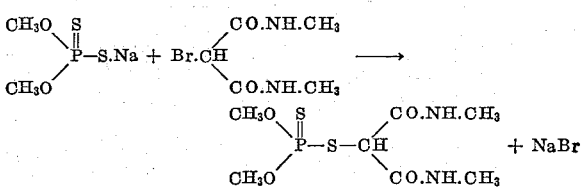

Good yields of the desired esters are generally obtained when the reaction is carried out in the presence of an inert solvent. Such solvents are water, aliphatic alcohols of low molecular weight, ketones such as acetone, methyl ethyl ketone, aliphatic esters such as ethyl acetate, saturated aliphatic nitriles such as acetonitrile, dioxan, chlorobenzene, chlorinated hydrocarbons such as chloroform or ethylene chloride. However, it is also possible to work in a two-phase system, for instance water/ethylene chloride.

The reaction is preferably carried out at between room temperature and up to about 80° C. However, temperatures outside this range may be employed depending on the type of starting material and on the solvents employed.

Surprisingly, the di-halogenomalonic ester amides do not react so as to form esters of the general formula:

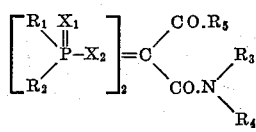

Instead, the same esters are obtained as are also obtained from the monohalogeno-malonic-ester amides or diamides of the formula described more above and in which $X_3$ is hydrogen.

Further inventive compounds may be obtained by the use of derivatives of cyclic halogenomalonic diamides such as are present in barbituric acid compounds for instance. The following general formula may represent such reaction components.

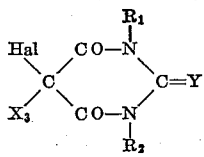

In this formula Hal denotes either chlorine of bromine,
$X_3$ represents hydrogen, an alkyl or aryl residue or halogen,
$R_1$ and $R_2$ are hydrogen or an alkyl residue, and
Y may be oxygen or sulfur or the imino group.

By reaction of such compounds with suitable (thio-) phosphoric (phosphonic or phosphinic) acids, esters of the following general formula are obtained.

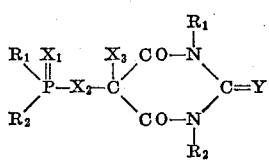

The significance of the symbols is the same as specified above. If $X_3$ in the barbituric acid compound was a halogen atom, also here esters of the following general formula

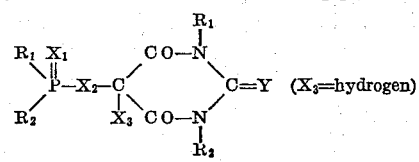

are again solely obtained rather than types of reaction products in which the phosphoric acid part is present two times.

The esters obtained according to the invention are all intended for use as pest control agents as well as agents to protect against corrosion, plasticisers, flotation agents, or additives to crude oil.

They very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers, are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae

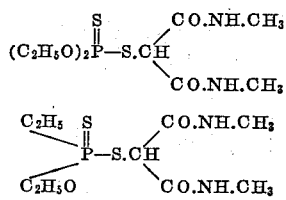

have been tested against aphids, and spider mites. Aqueous solutions of the aforementioned compound have been prepared by admixing them with the same amount of an auxiliary solvent (acetone). A commercial emulsifier (benzyl hydroxyl diphenyl polyglycol ether) is added in an amount of 20% referred to active ingredient. This premixture then is diluted with water to the desired concentration. The tests have been carried out as follows:

(a) Against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| 1 | 0.0001 | 100 |
| 2 | 0.001 | 100 |

(b) Against spider mites (contact-insecticidal action). Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours, 8 days. The following results have been obtained:

| Compound | Aqueous concentration (in percent active ingredient/water) | Killing rate (in percent) |
|---|---|---|
| 1 | 0.001 | 90 |
| 2 | 0.001 | 100 |

The invention is further explained in the following examples:

*Example 1*

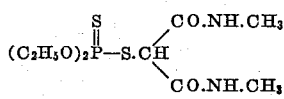

34 g. (0.163 mol) of bromomalonic-di-monomethyl-amide (M.P. 164° C., J. V. Backes, R. W. West, and M. A. Whiteley, J. Chem. Soc. 119 [1921], 365) and 40.5 g. (0.2 mol) of the ammonium salt of diethyl-dithio-phosphoric acid are heated at 50–60° C. for a half hour in 200 cc. of acetonitrile. After cooling, the mixture is poured into water, and the precipitate is filtered off with suction. When recrystallised from five times its weight of acetonitrile, the ester is obtained in the form of colorless needles of M.P. 159° C. Yield 51 g., i.e. quantitative.

Mol. weight 314.4—Calc.: N, 8.91; S, 20.39; P, 9.85.
Found: N, 9.14; S, 20.53; P, 9.94.

*Example 2*

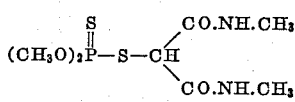

63 g. (0.25 mol) of bromomalonic-di-monomethylamide (M.P. 164° C.) and 65 g. (0.37 mol) of the ammonium salt of dimethyl-dithiophosphoric acid are heated at 50–60° C. for a half hour in 250 cc. of acetonitrile. After cooling, the product is filtered off with suction and the solvent distilled off. The residue is suspended in water and filtered off with suction. The ester is obtained from two and a half times its weight of acetonitrile, in the form of colourless, coarse crystals of M.P. 135° C. Yield 70.5 g., i.e. 98.5% of the theoretical.

Mol. weight 286.3—Calc.: N, 9.78; S, 22.40; P, 10.84.
Found: N, 9.81; S, 22.19; P, 10.46.

*Example 3*

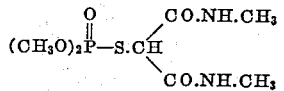

42 g. (0.2 mol) of bromomalonic-di-methylamide (M.P. 164° C.) and 38 g. (0.24 mol) of the ammonium salt of dimethyl-thiolphosphoric acid are stirred at room temperature for one hour in 150 cc. of acetonitrile. The salts are filtered off with suction, and the solvent is distilled off in vacuo. The glass-like residue is repeatedly stirred with chloroform, and the combined extracts are distilled. The residual oil gradually crystallises and is rubber with ether. Melting point: 113° C. Yield 50 g. rubbed with ether. Melting point: 113° C. Yield 50 g.

Mol. weight 270.3—Calc.: N, 10.37; P, 11.46. Found: N, 10.33; P, 11.68.

Example 4

$$(C_2H_5O)_2\overset{O}{\underset{\|}{P}}-S-CH\begin{matrix}CO.NH.CH_3\\CO.NH.CH_3\end{matrix}$$

35 g. (0.168 mol) of bromomalonic-di-monomethylamide and 38 g. (0.197 mol) of the ammonium salt of diethylthiolphosphoric acid are first stirred at room temperature for a half hour in 150 cc. of acetonitrile whereby a practically complete reaction is attained. To complete the reaction, the product is heated at 50–60° C. for a half hour, the salts are filtered off with suction after cooling, and the solvent is distilled off in vacuo. The residual oil rapidly crystallises and is recrystallised from twice its weight of acetonitrile. A fine grain, colourless, crystalline powder of M.P. 111° C. Yield 55 g. (92.2% of the theoretical).

Mol. weight 298.3—Calc.: N, 9.39; S, 10.75; P, 10.38. Found: N, 9.68; S, 10.80; P, 10.35.

Example 5

$$\begin{matrix}C_2H_5\\C_2H_5O\end{matrix}\overset{S}{\underset{\|}{P}}-S.CH\begin{matrix}CO.NH.CH_3\\CO.NH.CH_3\end{matrix}$$

42 g. (0.2 mol) of bromomalonic-di-monomethylamide and 46 g. (0.22 mol) of the potassium salt of ethyl-thionothiolphosphonic acid ethyl ester are heated at 50–60° C. in 150 cc. of acetonitrile for a half hour. After cooling, the mixture is poured into water and filtered off with suction. When recrystallised from much water, the ester is obtained in the form of very fine, colourless needles of M.P. 137° C. Yield 55 g., i.e. 92.3% of the theoretical.

Mol. weight 298.4—Calc.: N, 9.39; S, 10.38; P, 21.49. Found: N, 9.49; S, 10.61; P, 21.61.

Example 6

$$\begin{matrix}CH_3\\C_2H_5O\end{matrix}\overset{S}{\underset{\|}{P}}-S-CH\begin{matrix}CO.NH.CH_3\\CO.NH.CH_3\end{matrix}$$

36 g. (0.22 mol) of methyl-thionothiolphosphonic acid ethyl ester are dissolved in 200 cc. of acetonitrile. By introducing ammonia at 20–25° C. until the solution is neutral, the ammonium salt of the acid precipitates. After addition of 42 g. (0.2 mol) of bromomalonic-di-monomethylamide, it is heated at 50–60° C. for a half hour. After cooling, it is poured into water and the precipitate filtered off with suction. The ester is obtained from two and a half times its weight of acetonitrile in the form of strongly clustered, colourless small needles of M.P. 149° C. Yield 35 g. (61.5% of the theoretical).

Mol. weight 284.5—Calc.: N, 9.85; S, 22.54; P, 10.89. Found: N, 9.82; S, 22.37; P, 10.47.

By the same way there may be obtained the following compound:

$$\begin{matrix}C_6H_5\\C_2H_5O\end{matrix}\overset{S}{\underset{\|}{P}}-S-CH\begin{matrix}CO.NH.CH_3\\CO.NH.CH_3\end{matrix}$$

Example 7

$$(C_2H_5O)_2\overset{S}{\underset{\|}{P}}-S-CH\begin{matrix}CO.NH.C_2H_5\\CO.NH.C_2H_5\end{matrix}$$

72 g. (0.3 mol) of bromomalonic-di-mono-ethylamide (M.P. 160° C.; J. V Backes, R. W. West and M. A. Whiteley, J. Chem. Soc. 119 [1921] 366) and 73 g. (0.36 mol) of the ammonium salt of diethyl-dithiophosphoric acid are suspended in 250 cc. of acetonitrile. The temperature rises very quickly to 36° C. during this process. After heating at 50–60° C. for a half hour, the product is allowed to cool, poured into water and filtered off with suction. The ester is obtained from five times its weight of isopropyl alcohol in the form of very fine, colourless small needles of M.P. 156° C. Yield 90 g., i.e. 87.8% of the theoretical.

Mol. weight 342.4—Calc.: N, 8.18; S, 18.73; P, 9.05. Found: N, 8.21; S, 19.19; P, 9.21.

Example 8

$$(C_2H_5O)_2\overset{S}{\underset{\|}{P}}-S-CH\begin{matrix}CO.NH_2\\CO.NH_2\end{matrix}$$

54 g. (0.3 mol) of bromomalonic-diamide (M.P. 174° C.) and 72 g. (0.36 mol) of the ammonium salt of diethyl-dithiophosphoric acid are suspended in 250 cc. of acetonitrile. The suspension is stirred at room temperature for a half hour, whereupon the temperature slowly rises to 30° C. Thereafter, it is poured into water and filtered off with suction. After being pressed out onto clay, it is recrystallised from two and a half times its weight of acetonitrile. M.P. 148° C. Yield 35 g. (40.8% of the theoretical).

Mol. weight 286.3—Calc.: N, 9.79; S, 22.40; P, 10.82. Found: N, 9.80; S, 22.15; P, 11.06.

Example 9

$$(CH_3O)_2\overset{S}{\underset{\|}{P}}-S-CH\begin{matrix}CO.NH_2\\CO.NH_2\end{matrix}$$

54 g. (0.3 mol) of bromomalonic-diamide (M.P. 174° C.) and 61 g. (0.36 mol) of the ammonium salt of dimethyl-dithiophosphoric acid are suspended in 250 cc. of acetonitrile. After stirring at room temperature for a half hour, the suspension is heated at 50–60° C. for a short time and after cooling poured into water. The precipitated ester is filtered off with suction and recrystallised from methanol. M.P. 170° C.

Mol. weight 258.3—Calc.: N, 10.85; S, 24.82. Found: N, 10.51; S, 24.53.

Example 10

$$(C_2H_5O)_2\overset{O}{\underset{\|}{P}}-S-C\begin{matrix}C_2H_5\\\\CO.NH\end{matrix}\begin{matrix}CO-NH\\\\\end{matrix}CO$$

47 g. (0.2 mol) of bromoethyl-barbituric acid (M.P. 199° C.; J. Chem. Soc. 1931, 1872) are dissolved in 200 cc. of acetone. This solution is added dropwise, starting at 20° C., to a solution of 45 g. (0.24 mol) of the ammonium salt of diethyl-thiolphosphoric acid in 150 cc. of acetone. During this process, the temperature gradually rises to 32–35° C. After stirring has been continued for one hour, the reaction product is poured into water and filtered off with suction. When recrystallised from a little methanol, the ester has a melting point of 178° C.

Mol. weight 324—Calc.: N, 8.64; S, 9.89. Found: N, 8.39; S, 9.94.

By the same way there may be obtained the following compounds:

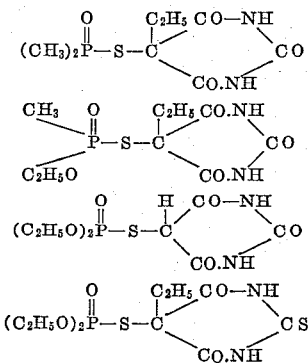

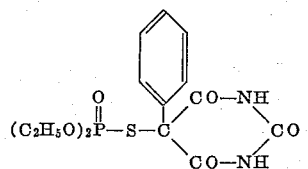

Example 11

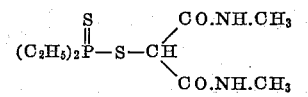

25 g. (0.134 mol) of the ammonium salt of diethyl-thiolphosphoric acid are dissolved in 150 cc. of acetone. 28 g. (0.1 mol) of phenylbromo-barbituric acid are slowly introduced into this solution. The temperature slowly rises to 30° C. during this process. The solution is stirred overnight then poured into water and filtered off with suction. Colourless crystals, from ether/petroleum ether, of M.P. 163° C. Yield 13 g.

Mol. weight 348—Calc.: N, 8.05; S, 9.21. Found: N, 8.36; S, 9.12.

Example 12

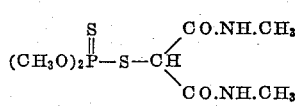

A solution of 53 g. (0.33 mol) of potassium diethyl-thionothiolphosphinate in 200 cc. of water is added dropwise at 70–80° C. to a solution of 63 g. (0.3 mol) of bromomalonic-di-monomethylamide in 1 litre of water. After 10 minutes, it is allowed to cool whilst stirring, and the ester, which precipitates in the form of splendid crystals, is filtered off with suction. M.P. 134° C. Yield 58 g., i.e. 68.7% of the theoretical.

Example 13

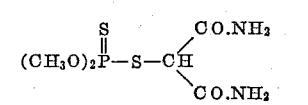

57.5 g. (0.2 mol) of dibromomalonic-di-monomethylamide (M.P. 101° C.; J. V. Backes, R. W. West, and M. A. Whiteley, J. Chem. Soc. 119 [1921] 366) and 82 g. (0.46 mol) of the ammonium salt of dimethyl-dithiophosphoric acid are heated at 60° C. for a half hour in 300 cc. of acetonitrile. After cooling, the product is poured into water and the oil taken up in benzene. It is first washed with water, then briefly with a sodium bicarbonate solution and finally with water until it is again neutral. After drying over sodium sulphate, the solvent is distilled off. The residue is rubbed with ether and filtered off with suction. The ester is obtained from acetonitrile in the form of colourless crystals of M.P. 135° C.

Example 14

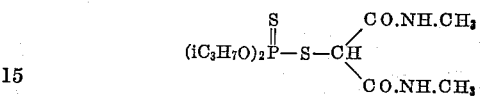

80 g. (0.307 mol) of dibromomalonic-diamide (M.P. 206° C.) are dissolved in 2.4 litres of water at 70–80° C. 129 g. (0.74 mol) of the ammonium salt of dimethyl-dithiophosphoric acid, dissolved in 200 cc. of water, are rapidly added dropwise to this solution. A yellowish oil immediately separates from the solution. It is stirred for another 10 minutes and is quickly cooled. The oil thereby crystallises. It is filtered off with suction and recrystallised from methanol or acetonitrile. M.P. 168–170° C. Yield 71 g. (89.6% of the theoretical).

Example 15

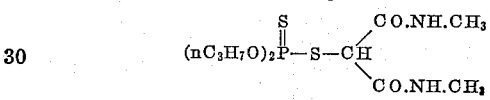

63 g. (0.3 mol) of bromomalonic-di-monomethylamide and 83 g. (0.36 mol) of the ammonium salt of diisopropyl-dithiophosphoric acid are suspended in 350 cc. of acetonitrile. The temperature thereupon slowly rises to 40° C., and the ester separates as the solution becomes viscous. After stirring at room temperature for two hours, it is filtered off with suction and washed with water. The ester is obtained from three times its weight of isopropyl alcohol as fine, clustered small needles of M.P. 179° C. Yield 102 g., i.e. quantitative.

Example 16

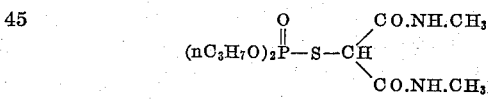

83 g. (0.3 mol) of the ammonium salt of di-n-propyl-dithiophosphoric acid are rapidly introduced without cooling into a suspension of 63 g. (0.3 mol) of bromomalonic-di-monomethylamide in 350 cc. of acetonitrile. The temperature rises to 40° C., and the solution can hardly be stirred any longer since the ester already crystallises. After stirring for another two hours, it is filtered off with suction and washed with water. The ester is obtained from twice its weight of isopropyl alcohol in the form of colourless crystals of melting point 162° C. Yield 99 g., i.e. 97% of the theoretical.

Example 17

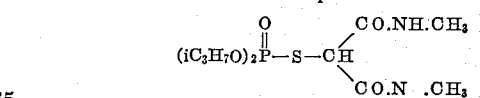

52 g. (0.24 mol) of the ammonium salt of di-n-propyl-thiolphosphoric acid are introduced into a solution of 42 g. (0.2 mol) of bromomalonic-bis-monomethylamide in 150 cc. of acetonitrile. It is stirred overnight at room temperature and in the morning ammonium bromide is filtered off with suction. The solvent is distilled off in vacuo and the residue allowed to crystallise. The crystals are suspended in ether and filtered off with suction. The ester is obtained from ether/benzene as colourless crystals with M.P. 78° C. The ester is water-soluble. Yield 56 g., corresponding to 85.8% of the theoretical.

Example 18

A solution of 42 g. (0.2 mol) of bromomalonic-bis-monomethylamide in 150 cc. of acetonitrile and 52 g. (0.24 mol) of the ammonium salt of diisopropyl-thiolphosphoric acid are stirred overnight at room temperature. Ammonium bromide is filtered off with suction, and the solvent is distilled off in vacuo. The residue from the distillation crystallises rapidly. The ester is obtained from ether/benzene as strongly clustered, colourless needles with M.P. 95° C. Yield 61 g., corresponding to 93.4% of the theoretical.

Example 19

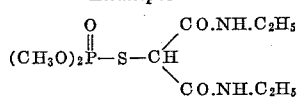

A suspension of 71 g. (0.3 mol) of bromomalonic acid-di-N-mono-ethylamide (M.P. 160° C.) and 58 g. (0.33 mol) of ammonium O,O-dimethyl-thiolphosphate in a mixture of 150 cc. of water and 50 cc. of acetone is heated to 50° C. until all the solid components have dissolved. To complete the reaction, the reaction mixture is stirred overnight at room temperature, then salted out with sodium sulphate and extracted by shaking it three times with 100 cc. portions of methylene chloride each time. After drying the methylene chloride solution over sodium sulphate, the solvent is distilled off in vacuo. The residue from the distillation solidifies on cooling, and when this is stirred with ether, there are obtained yellowish crystals with M.P. 77° C. Yield 52 g. (58.2% of the theoretical).

*Analysis.*—Calculated for molecular weight 298.4: N, 9.38%; S, 10.74%; P, 10.38%. Found: N, 9.44%; S, 11.03%; P, 10.48%.

On rats per os the mean toxicity of the compound amounts to 50 mg. per kg. of animal.

Example 20

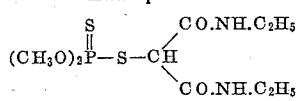

71 g. (0.3 mol) of bromomalonic acid-di-N-monoethlyamide (M.P. 160° C.) and 63 g. (0.36 mol) of ammonium O,O-dimethyl-thionothiolphosphate are heated at 50° to 60° C. for a half hour in 250 cc. of acetonitrile. After the mixture has cooled, 250 cc. of water are added, whereupon the reaction product first separates as an oil which rapidly crystallises. The crystals are filtered off with suction and after being dried recrystallised from four to five times their weight of isopropyl alcohol. M.P. 131° C. Yield 63 g. (67.2% of the theoretical).

*Analysis.*—Calculated for molecular weight 314.4: N, 8.91%; S, 20.39%; P, 9.85%. Found: N, 8.81%; S, 20.40%; P, 9.76%.

On rats per os the mean toxicity of the compound amounts to more than 1000 mg. per kg. of animal.

The product can also be prepared in aqueous solution by the following method:

A mixture of 71 g. (0.3 mol) of bromomalonic acid-di-N-monoethylamide (M.P. 160° C.) and 167 g. (0.33 mol) of a 30% aqueous solution of sodium O,O-dimethyl-thionothiolphosphate diluted with 150 cc. of water is stirred vigorously at 50 to 60° C. for a half hour. After the reaction mixture has cooled, the crystals are filtered off with suction and recrystallised from 30 times their weight of water, whereupon the reaction product is obtained pure in the form of colourless needles of M.P. 130 to 131° C. Yield 94 g. (quantitative).

Example 21

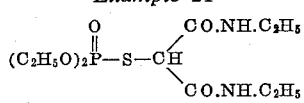

A mixture of 71 g. (0.3 mol) of bromomalonic acid-di-N-monoethylamide, 75 g. (0.4 mol) of ammonium O,O-diethyl-thiolphosphate and 250 cc. of acetonitrile is firts stirred at room temperature for a half hour and subsequently heated at 50 to 60° C. with stirring for the same time. Thereafter, the mixture is stirred overnight at room temperature, and the precipitated ammonium bromide is filtered off with suction the following morning. The solvent is distilled off from the filtrate. The residue largely solidifies. For the purpose of purification, it is dissolved in methylene chloride, and the solution in methylene chloride is briefly washed with a saturated solution of common salt. After the organic phase has been dried and the solvent distilled off, the residue solidifies completely. On recrystallisation from twice its weight of ethyl acetate, colourless crystals of M.P. 100 to 101° C. are obtained. The yield amounts to 78 g. (76.8% of the theoretical).

*Analysis.*—Calculated for molecular weight 338.5: N, 8.28%; S, 9.47%; P, 9.15%. Found: N, 8.53%; S, 9.58%; P, 9.35%.

On rats per os the mean toxicity ($LD_{50}$) of the compound amounts to 10 mg. per kg. of animal.

Example 22

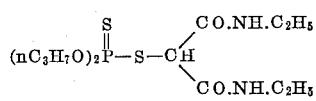

83 g. (0.36 mol) of ammonium O,O-di-n-propyl-thionothiolphosphate are introduced into a solution of 71 g. (0.3 mol) of bromomalonic acid-di-N-monoethylamide in 350 cc. of acetonitrile whereupon the temperature of the mixture rises from 20 to 31° C. After stirring at room temperature for two hours, the reaction mixture is poured into water, and the separated precipitate is filtered off with suction. The latter is dried and then recrystallized from three times its weight of acetonitrile. M.P. 154° C. Yield 100 g. (90.2% of the theoretical).

*Analysis.*—Calculated for molecular weight 370.5: N, 7.56%; S, 17.31%; P, 8.36%. Found: N, 7.69%; S, 17.22%; P, 8.40%.

On the rats per os the mean toxicity of the compound is 1000 mg. per kg. of animal.

Example 23

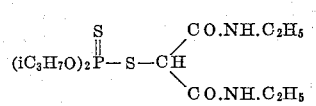

71 g. (0.3 mol) of bromomalonic acid-di-N-monoethylamide (M.P. 160° C.) are dissolved in 350 cc. of acetonitrile, and 83 g. (0.36 mol) of ammonium O,O-diisopropyl-thionothiolphosphate are introduced into this solution. The reaction is exothermal (temperature rises from 22° C. to 33° C.) After stirring the mixture for two hours, it is poured into water and worked up as described in the preceding example. On recrystallisation from acetonitrile, the product is obtained in the form of very fine, colourless needles of M.P. 167° C. Yield 110 g. (quantitative).

*Analysis.*—Calculated for molecular weight 370.5: N, 7.56%; S, 17.31%; P, 8.36%. Found: N, 7.47%; S, 17.25%; P, 8.45%.

On the rats per os the mean toxicity of the compound amounts to 100 mg. per kg. of animal.

Example 24

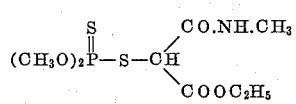

68 g. (0.3 mol) of bromomalonic acid-ethyl ester-N-monomethylamide (M.P. 107° C.) and 64 g. (0.36 mol) of ammonium O,O-dimethyl-thionothiolphosphate are dissolved in 300 cc. of acetone. The temperature of the mixture spontaneously rises slowly to about 28 to 30° C., whilst ammonium bromide separates. After stirring for a half hour, the precipitated salt is filtered off with suction, and the solvent evaporated from the filtrate in vacuo. The residue is treated with water, whereupon the reaction product rapidly crystallises. When the latter is recrystallised from ether, there are obtained fine, ivory-coloured crystals with M.P. 52° C. Yield 68 g. (75.4% of the theoretical).

*Analysis.*—Calculated for molecular weight 301.3: N, 4.65%; S, 21.28%; P, 10.28%. Found: N. 4.79%; S, 21.49%; P, 10.47%.

On peroral administration of 1000 mg. of the compound per kg. of rat, the test animals do not exhibit any symptoms.

By the same way there may be obtained the following compounds:

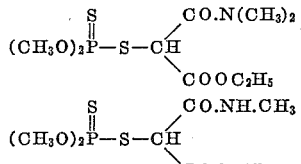

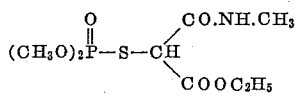

*Example 25*

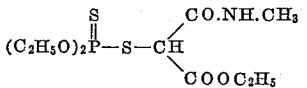

A solution of 47 g. (0.21 mol) of bromomalonic acid ethyl ester-N-monomethylamide (M.P. 107° C.) and 35 g. (0.22 mol) of ammonium O,O-dimethyl-thiolphosphate in 100 cc. of water is stirred overnight at room temperature. The reaction mixture is then heated at 70° C. for 15 minutes, and after cooling treated with sufficient additional water to redissolve the separated oil. The mixture is subsequently salted out with sodium sulphate, extracted by shaking repeatedly with methylene chloride, the solution in methylene chloride is dried and decolourised with animal charcoal, and the solvent is distilled off. 52 g. (91.3% of the theoretical) of a viscous, orange-coloured oil are obtained as residue which cannot be distilled even in a high vacuum.

*Analysis.*—Calculated for molecular weight 285.3: N, 5.91%; S, 11.24%; P, 10.86%. Found: N, 6.16%; S, 11.27%; P, 10.80%.

On rats per os the mean toxicity of the compound amounts to about 150 mg. per kg. of animal.

*Example 26*

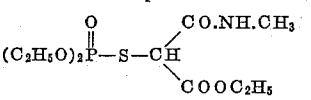

68 g. (0.3 mol) of bromomalonic acid-ethyl ester-N-monomethylamide (M.P. 107° C.) are dissolved in 250 cc. of acetone. 74 g. (0.36 mol) of ammonium O,O-diethyl-thionothiolphosphate are introduced into this solution with cooling so that the temperature of the mixture does not exceed 35° C. The reaction mixture is subsequently stirred for another half hour and then poured into ice water. The separated oil solidifies rapidly in the form of crystals. The crystal mass is filtered off with suction and recrystallised from ether. There are obtained colourless needles of M.P. 75° C. Yield 74 g. (74.8% of the theoretical).

*Analysis.*—Calculated for molecular weight 329.4: N, 4.25%; S, 19.47%; P, 9.41%. Found: N, 4.31%; S, 19.33%; P, 9.31%.

On rats per os the mean toxicity of the compound amounts to 150 mg. per kg. of animal.

*Example 27*

$$\begin{array}{c} O \\ \| \\ (C_2H_5O)_2P-S-CH \end{array} \begin{array}{c} CO.NH.CH_3 \\ \diagdown \\ COOC_2H_5 \end{array}$$

A mixture of 68 g. (0.3 mol) of bromomalonic acid-ethyl ester-N-monomethylamide, 67 g. (0.36 mol) of ammonium O,O-diethyl-thiolphosphate and 200 cc. of acetone is stirred for one hour, whereupon a weakly exothermal reaction ensues. The separated ammonium bromide is filtered off with suction, the solvent evaporated from the filtrate, the residue which is left is dissolved in water, the solution salted out with sodium sul- phate, and the separated oil is taken up in benzene. The benzene solution is dried over sodium sulphate. After the solvent has been distilled off, a viscous red-brown oil is obtained. The yield amounts to 47 g. (50.2% of the theoretical).

*Analysis.*—Calculated for molecular weight 313.3: N, 4.47%; S, 10.23%; P, 9.89%. Found: N, 4.41%; S, 10.37%; P, 9.92%.

*Example 28*

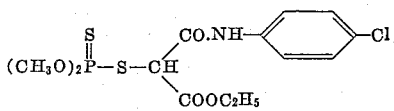

44 g. (0.24 mol) of ammonium O,O-dimethyl-thionothiolphosphate are rapidly introduced into a solution of 64 g. (0.2 mol) of bromomalonic acid-ethyl ester-4-chloroanilide (M.P. 109° C.) in 200 cc. of acetonitrile, whereupon a weakly exothermal reaction results and ammonium bromide soon starts to separate. After the reaction mixture has been stirred at room temperature for one hour, it is poured into water, the separated oil taken up in benzene, the solution in benzene washed with water, dried over sodium sulphate, and the solvent is distilled off. There remain 69 g. (86.8% of the theoretical) of a brown viscous oil.

*Analysis.*—Calculated for molecular weight 397.8: N, 3.52%; S, 16.12%; Cl, 8.91%. Found: N, 3.60%; S, 16.01%; Cl, 8.73%.

On peroral administration of 1000 mg. per kg. of body weight, rats do not yet indicate any symptoms.

*Example 29*

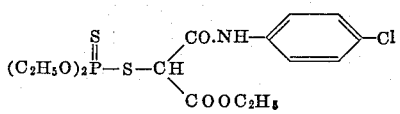

64 g. (0.2 mol) of bromomalonic acid-ethyl ester-4-chloranilide (M.P. 109° C.) and 50 g. (0.24 mol) of ammonium O,O-diethyl-thionothiolphosphate are reacted in 200 cc. of acetonitrile under reaction conditions analogous to those in the preceding example. After the mixture has been worked up according to the method described in Example 28, there are obtained 80 g. (93.8% of the theoretical) of a brown viscous oil.

*Analysis.*—Calculated for molecular weight 425.9: N, 3.29%; S, 15.06%; P, 7.27%. Found: N, 3.37%; S, 15.30%; P, 7.43%.

The mean toxicity (LD$_{95}$) of the compound, on the rats per os, amounts to about 1000 mg. per kg. of body weight, whilst 500 mg./kg. are still tolerated by the test animals without evidence of symptoms.

*Example 30*

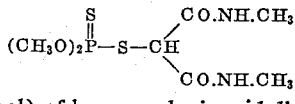

42 g. (0.2 mol) of bromomalonic acid-di-N-monomethylamide (M.P. 164° C.) and 0.22 mol of a 30.5% aqueous solution of sodium O,O-dimethyl thionothiolphosphate (76 g.) are heated at 60 to 70° C. for 15 minutes. After the mixture has cooled, the separated crystals are filtered off with suction and washed with a little ice-cold water. The reaction mixture melts at 135° C. The yield amounts to 54 g. (94.4% of the theoretical).

*Example 31*

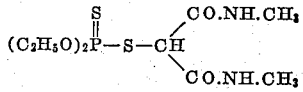

A mixture of 28 g. (0.17 mol) of chloromalonic acid-di-N-monomethylamide (M.P. 158° C.), 40.5 g. (0.2 mol) of ammonium O,O-diethyl-thionothiolphosphate, and 100 cc. of acetonitrile is heated to boiling under reflux for one hour. After the reaction mixture has cooled, it is treated with water and the separated precipitate filtered off with suction. On recrystallisation of the latter from twice its weight of methanol, colourless needles with M.P. 159° C. are obtained. Yield: 37 g. (69.5% of the theoretical).

*Analysis.*—Calculated for molecular weight 319.4: N, 8.91%; S, 20.39%; P, 9.85%. Found: N, 8.84%; S, 20.12%; P, 9.93%.

*Example 32*

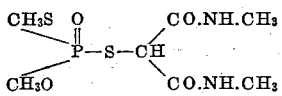

84 g. (0.4 mol) of bromomalonic acid-di-N-monomethylamide (M.P. 164° C.) and 94 g. (0.44 mol) of potassium O,S-dimethyl-thiolphosphate are stirred overnight at room temperature in 300 cc. of acetonitrile. The salt is filtered off with suction on the following morning, and acetonitrile is removed by distillation. The residual oil is rubbed with ether, whereupon it crystallises. The crystal mass is filtered off with suction and recrystallised from acetonitrile. Colourless needles of M.P. 115° C. are obtained. The yield amounts to 14 g. (12.3% of the theoretical). The product is water soluble.

*Analysis.*—Calculated for molecular weight 286.3: N, 9.79%; S, 22.40%; P, 10.82%. Found: N, 9.76%; S, 22.31%; P, 10.71%.

On the rats per os the mean toxicity of the compound amounts to about 500 mg. per kg. of animal.

The insecticidal activities of some of the compounds shown in the foregoing examples are to be seen from the following table:

| Compound | Insect | Concentration in percent (aqueous emulsion) | Killing rate in percent |
|---|---|---|---|
| Example 1 | Aphids | 0.0001 | 100 |
|  | Spider mites | 0.001 | 90 |
| Example 2 | Aphids | 0.001 | 100 |
|  | Spider mites | 0.01 | 40 |
| Example 3 | Aphids | 0.004 | 90 |
|  | Spider mites | 0.004 | 50 |
| Example 4 | Aphids | 0.001 | 70 |
|  | Spider mites | 0.001 | 70 |
| Example 5 | Aphids | 0.001 | 100 |
|  | Spider mites | 0.001 | 100 |
| Example 6 | Aphids | 0.01 | 70 |
|  | Spider mites | 0.001 | 100 |
| Example 7 | Aphids | 0.0001 | 70 |
|  | Spider mites | 0.01 | 90 |
| Example 8 | Aphids | 0.1 | 100 |
|  | Flies | 0.1 | 100 |
| Example 11 | Spider mites | 0.1 | 100 |
| Example 12 | Aphids | 0.01 | 100 |
|  | Spider mites | 0.01 | 95 |
| Example 14 | Systemic action | 0.1 | 100 |
| Example 15 | Aphids | 0.1 | 100 |
|  | Systemic action | 0.1 | 100 |
| Example 16 | Caterpillars | 0.1 | 100 |
|  | Systemic action | 0.1 | 100 |
| Example 17 | Aphids | 0.01 | 100 |
|  | Systemic action | 0.1 | 100 |
| Example 18 | Aphids | 0.01 | 100 |
|  | Systemic action | 0.1 | 100 |
| Example 19 | Aphids | 0.01 | 90 |
|  | Spider mites | 0.001 | 100 |
| Example 20 | Aphids | 0.001 | 100 |
|  | Spider mites | 0.001 | 70 |
| Example 21 | Aphids | 0.001 | 100 |
|  | Spider mites | 0.001 | 50 |
| Example 22 | Caterpillars | 0.1 | 100 |
|  | Systemic action | 0.1 | 100 |
| Example 23 | Aphids | 0.1 | 100 |
|  | Caterpillars | 0.1 | 100 |
| Example 24 | Caterpillars | 0.1 | 100 |
|  | Spider mites | 0.01 | 100 |
| Example 25 | Aphids | 0.01 | 80 |
|  | Caterpillars | 0.1 | 100 |
| Example 26 | Aphids | 0.01 | 100 |
|  | Caterpillars | 0.1 | 100 |
| Example 27 | Spider mites | 0.01 | 100 |
|  | Flies | 0.01 | 100 |
| Example 28 | Aphids | 0.01 | 100 |
| Example 29 | Aphids | 0.1 | 100 |
|  | Spider mites | 0.1 | 100 |
| Example 32 | Aphids | 0.01 | 100 |
|  | Spider mites | 0.1 | 100 |

We claim:
1. A compound of the formula

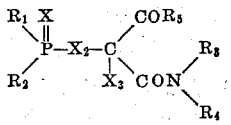

in which $R_1$ and $R_2$ stand for members selected from the group consisting of lower alkyl, phenyl, lower alkoxy and lower alkylmercapto; X stands for a member selected from the group consisting of oxygen and sulfur; $X_2$ stands for sulfur; $X_3$ stands for a member selected from the group consisting of hydrogen, lower alkyl, phenyl and a halogen atom; wherein $R_3$ and $R_4$ are each selected from the group consisting of hydrogen, lower alkyl, and phenyl when considered separately and morpholino, piperidino, piperazino, pyrrolidino when taken with the nitrogen atom, $R_5$ is a member selected from the group consisting of

lower alkoxy and lower alkyl mercapto.

2. A compound of the formula

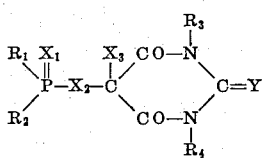

wherein $R_1$ and $R_2$ are each selected from the group consisting of lower alkyl, phenyl, lower alkoxy and lower alkylmercapto; $R_3$ and $R_4$ are each selected from the group consisting of hydrogen, lower alkyl, phenyl, lower alkoxy and lower alkylmercapto; $X_1$ stands for a member selected from the group consisting of oxygen and sulfur; $X_2$ stands for sulfur; $X_3$ stands for a member selected from the group consisting of hydrogen, lower alkyl radical, phenyl and a halogen atom; and Y is a member selected from the group consisting of oxygen, sulfur and NH.

3. A compound of the formula

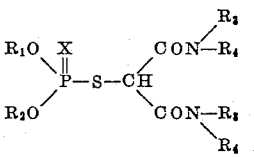

in which $R_1$ and $R_2$ is lower alkyl, X is a member selected from the group consisting of oxygen and sulfur, $R_3$ and $R_4$ are each selected from the group consisting of hydrogen, lower alkyl when considered separately and piperidino when taken with the nitrogen atom.

4. A compound of claim 1 wherein $R_1$ and $R_2$ are each lower alkoxy; $R_5$ is

group, each $R_3$ is hydrogen and each $R_4$ is lower alkyl; $X_1$ and $X_2$ are each sulfur and $X_3$ is hydrogen.

5. A compound of claim 1 wherein $R_1$ and $R_2$ are each lower alkoxy; $R_5$ is

group, each $R_3$ is hydrogen and each $R_4$ is lower alkyl; $X_1$ is oxygen, $X_2$ is sulfur, and $X_3$ is hydrogen.

6. A compound of claim 1 wherein $R_1$ and $R_2$ are each lower alkoxy and $R_3$ is lower alkyl, $X_3$ and $R_4$ are each hydrogen, $R_5$ is lower alkoxy and $X_1$ and $X_2$ are each sulfur.

7. A compound of claim 1 wherein $R_1$ and $R_2$ are each lower alkoxy and $R_3$ is lower alkyl, $X_3$ and $R_4$ are each hydrogen, $R_5$ is lower alkoxy and $X_1$ is oxygen and $X_2$ is sulfur.

8. A compound of claim 2 wherein $R_1$ and $R_2$ are each lower alkoxy, $R_3$, $R_4$ and $X_3$ are each hydrogen; $X_1$ is a chalcogen having an atomic weight from 8 to 16; $X_2$ is sulfur and Y is a chalcogen having an atomic weight from 8 to 16.

9. A compound of claim 2 wherein $R_1$ and $R_2$ are each lower alkoxy; $X_3$ is lower alkyl; $R_3$ and $R_4$ are each hydrogen and $X_1$, $X_2$ and Y are each a chalcogen having an atomic number from 8 to 16.

10. A compound of claim 1 wherein $R_1$ is lower alkyl and $R_2$ is lower alkoxy.

11. A compound of claim 1 wherein $R_1$ is phenyl and $R_2$ is lower alkoxy.

12. A compound of claim 2 wherein $R_1$ and $R_2$ are each lower alkyl.

13. A compound of claim 2 wherein $R_1$ is lower alkyl and $R_2$ is lower alkoxy.

14. A compound of claim 2 wherein $R_1$ and $R_2$ are each lower alkoxy.

15. The compound of the following formula

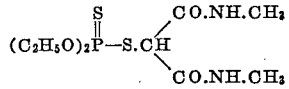

16. The compound of the following formula

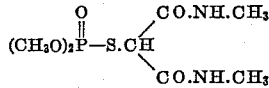

17. The compound of the following formula

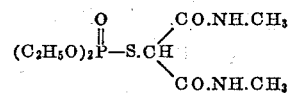

18. The compound of the following formula

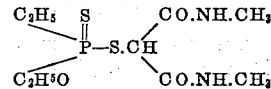

19. The compound of the following formula

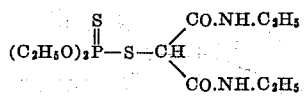

20. The compound of the following formula

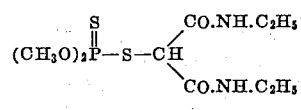

21. The compound of the following formula

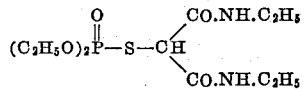

References Cited by the Examiner
UNITED STATES PATENTS
2,630,451   3/1953   Fletcher et al. _____ 260—461

JULIAN S. LEVITT, *Primary Examiner.*

MORRIS LIEBMAN, IRVING MARCUS, FRANK M. SIKORA, LEROY B. RANDALL,
*Assistant Examiners.*

UNITED STATES PATENT OFFICE
CERTIFICATE OF CORRECTION

Patent No. 3,283,038                                               November 1, 1966

Walter Lorenz et al.

It is hereby certified that error appears in the above numbered patent requiring correction and that the said Letters Patent should read as corrected below.

Column 1, lines 55 to 58, the left-hand formula should appear as shown below instead of as in the patent:

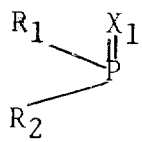

lines 60 to 65, the lower right-hand portion of the formula reading

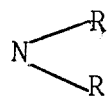                        read                        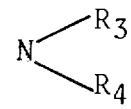

column 2, line 5, for "CH$_2$S" read -- CH$_3$S --; column 8, lines 61 to 64, the formula should appear as shown below instead of as in the patent:

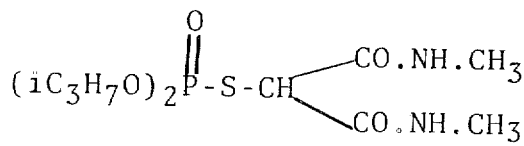

Signed and sealed this 5th day of September 1967.

(SEAL)
Attest:

ERNEST W. SWIDER
Attesting Officer                                     EDWARD J. BRENNER
                                                              Commissioner of Patents